Patented Apr. 12, 1949

2,466,674

UNITED STATES PATENT OFFICE 2,466,674

METHOD FOR INCREASING FLOW OF WELLS

Daniel J. Mullady, Kevin, Mont.

No Drawing. Application May 22, 1946,
Serial No. 671,659

8 Claims. (Cl. 252—8.55)

My invention relates to the treatment of wells to increase the rate of fluid production therefrom and, while applicable to wells producing gas, brines, and other fluids, is of especial advantage in the treatment of wells for the production of oil.

My invention is concerned with improvements in such processes of treatment of wells producing oil and other fluids from line or calcareous and dolomitic geological formations as utilize hydrochloric acid to effect a dissolution of a part of the geological formations. Well treatment processes involving the use of hydrochloric acid have been known for a number of years and, while reasonably effective under certain conditions for the treatment of certain types of wells, have been characterized by various disadvantages with which those versed in the art are familiar. One particular disadvantage has been the failure of the hydrochloric acid or compositions including hydrochloric acid adequately to attack the geological formations in order to bring about satisfactory enhancement of the productivity of the well.

I have found that the action of hydrochloric acid, in the treatment of wells, is markedly improved or enhanced or intensified if there is utilized, in conjunction therewith, one or more particular ammonium salts, namely, ammonium nitrite, and ammonium nitrate. Of particular utility is ammonium nitrate. By the practice of my invention, not only is the fluid recovery from the formations materially increased but the formations are more readily and easily cleared and the over-all results are significantly improved.

The amounts of the hydrochloric acid and the aforesaid ammonium salts utilized in any given case and the quantitative ratios of one to the other are subject to considerable variation depending, for example, upon the particular character of the geological formation involved and the extent of the increase or enhancement of the porosity sought to be obtained. The amount of hydrochloric acid (considered in the form of commercial or concentrated hydrochloric acid) used may range from several hundred to several thousand pounds and there may likewise be a wide range in the amount of the aforesaid ammonium salts. A ratio of about 80 to about 120 gallons of commercial hydrochloric acid to about 40 to about 100 pounds of the aforesaid ammonium salts is sufficient to serve for most situations. A particularly preferred embodiment comprises a ratio of about 100 gallons of commercial hydrochloric acid to about 60 pounds of ammonium nitrate, the latter being used in the form of a strong, preferably substantially saturated, aqueous solution.

The time during which the mixture of the hydrochloric acid and the aforesaid ammonium salts is allowed to remain in contact with the well formation is somewhat variable. In general, I prefer that the reaction between the reagents and the well formation be allowed to proceed until it reaches the end-point. In the usual case, this will be at the end of about 24 hours although, depending upon the exact character of the formation, this time may be appreciably shorter or longer.

The following examples are illustrative of the practice of my invention. It will be understood that various changes and modifications may be made which will be apparent to those versed in the art in the light of the teachings and guiding principles which are disclosed herein. Thus, for example, the total amounts of hydrochloric acid and aforesaid ammonium salts and the proportions thereof to each other may be varied, wells other than oil wells may be treated, the technique of treatment modified, and other changes may be made without departing from the scope of my invention.

Example 1

A saturated aqueous solution containing 60 pounds of ammonium nitrate was poured into an oil well, the geological formation being of a calcareous nature. Five barrels of crude oil were then added, followed by 100 gallons of commercial hydrochloric acid and then by sufficient crude oil to fill the well bore to the top. The well so treated was allowed to stand for about 24 hours and then pumped or swabbed.

Example 2

A saturated aqueous solution containing 60 pounds of ammonium nitrate and 20 pounds of ammonium fluoride (or ammonium bifluoride) was poured into an oil well of the type associated with a calcareous geological formation. Five barrels of crude oil were then added, followed by 100 gallons of commercial hydrochloric acid and then by sufficient crude oil to fill the well bore to the top. The well so treated was allowed to stand for about 24 hours and then pumped or swabbed.

It will be understood, in view of the foregoing disclosures, that the principles of the present invention may be utilized in conjunction with any well treatment procedures which involve the use of hydrochloric acid as such or in admixture with other reagents such as ammonium fluorides, hydrofluoric acid, sulfuric acid, and the like. In this connection, for example, the utilization of the particular ammonium salts referred to above, in conjunction with hydrochloric acid, may be effected in the manner heretofore described or by other acidizing procedures known to the art.

It will also be understood that the utilization of inhibitors, pursuant to known practice, to prevent or retard corrosion of metal piping and the like, is within the scope of the invention in conjunction with the improvements which I have described above.

While the invention has been described in detail, it is to be understood that the scope thereof is not to be limited other than is set forth in the claims.

What I claim as new and desire to protect by Letters Patent of the United States is:

1. In the process of treating wells to increase the rate of fluid production therefrom, the step which comprises introducing into said wells hydrochloric acid and at least one ammonium salt selected from the group consisting of ammonium nitrite and ammonium nitrate, the hydrochloric acid being present in amount greater than the amount of said ammonium salt, the amount of said ammonium salt being sufficient to enhance the action of the hydrochloric acid on materials in the earth formation.

2. In the process of treating wells to increase the rate of fluid production therefrom, the step which comprises introducing into said wells hydrochloric acid and at least one ammonium salt selected from the group consisting of ammonium nitrite and ammonium nitrate, said ingredients being present in a ratio of about 40 to about 100 pounds of the aforesaid ammonium salts to from about 80 to about 120 gallons of hydrochloric acid calculated as commercial hydrochloric acid.

3. In the process of acidizing oil wells of the type associated with calcareous or dolomitic formations whereby to increase the production of oil therefrom, the step which comprises effecting the acidizing by means of hydrochloric acid and at least one ammonium salt selected from the group consisting of ammonium nitrite and ammonium nitrate, the hydrochloric acid being present in amount greater than the amount of said ammonium salt, the amount of said ammonium salt being sufficient to enhance the action of the hydrochloric acid on materials in the earth formation.

4. In the process of acidizing oil wells of the type associated with calcareous or dolomitic formations whereby to increase the production of oil therefrom, the step which comprises effecting the acidizing by means of hydrochloric acid and at least one ammonium salt selected from the group consisting of ammonium nitrite and ammonium nitrate, said ingredients being present in a ratio of about 40 to about 100 pounds of the aforesaid ammonium salts to from about 80 to about 120 gallons of hydrochloric acid calculated as commercial hydrochloric acid.

5. In the process of acidizing oil wells of the type associated with calcareous or dolomitic formation whereby to increase the production of oil therefrom, the step which comprises effecting the acidizing by means of hydrochloric acid and ammonium nitrate, said reagents being employed in a ratio of about 100 gallons of substantially concentrated hydrochloric acid to about 40 to 100 pounds of ammonium nitrate.

6. In the process of treating oil wells of the type associated with calcareous or dolomitic formations to increase the rate of oil production therefrom, the steps which comprise pouring into the well a strong aqueous solution of at least one ammonium salt selected from the group consisting of ammonium nitrite and ammonium nitrate, then adding crude oil to the well, then adding hydrochloric acid to the well, the hydrochloric acid being utilized in an amount greater than the amount of said ammonium salt, the amount of acid ammonium salt being sufficient to enhance the action of the hydrochloric acid on materials in the earth formation, allowing the well to remain in contact with the aforesaid materials for a substantial number of hours, and then removing said materials.

7. In a process of treating oil wells of the type associated with calcareous or dolomitic formations to increase the rate of oil production therefrom, the steps which comprise pouring a substantially saturated solution of ammonium nitrate into the well, then adding crude oil to the well, then adding hydrochloric acid to the well, the hydrochloric acid being utilized in an amount greater than the amount of the ammonium nitrate, the amount of said ammonium nitrate being sufficient to enhance the action of the hydrochloric acid on materials in the earth formation, allowing the well to remain in contact with the aforesaid materials for not substantially less than 24 hours, and then removing said materials.

8. In a process of acidizing oil wells of the type associated with calcareous or dolomitic formations whereby to increase the production of oil therefrom, the step which comprises effecting the acidizing by means of hydrochloric acid and ammonium nitrate, said reagents being employed in a ratio of about 100 gallons of substantially concentrated hydrochloric acid to about 60 pounds of ammonium nitrate, and allowing the well to remain in contact with the aforesaid materials for a minimum of about 24 hours.

DANIEL J. MULLADY.

REFERENCES CITED

The following references are of record in the file of this patent:

UNITED STATES PATENTS

| Number | Name | Date |
|---|---|---|
| 2,011,579 | Heath et al. | Aug. 20, 1935 |
| 2,094,479 | Vandergrift | Sept. 28, 1937 |
| 2,224,297 | Holmes | Dec. 10, 1940 |
| 2,425,415 | Bond | Aug. 12, 1947 |